United States Patent
Gataric

(10) Patent No.: US 10,326,352 B2
(45) Date of Patent: Jun. 18, 2019

(54) CONTROL OF AC SOURCE INVERTER TO REDUCE TOTAL HARMONIC DISTORTATION AND OUTPUT VOLTAGE UNBALANCE

(71) Applicant: GE AVIATION SYSTEMS LLC, Grand Rapids, MI (US)

(72) Inventor: Slobodan Gataric, Xenia, OH (US)

(73) Assignee: GE Aviation Systems LLC, Grand Rapids, MI (US)

( * ) Notice: Subject to any disclaimer, the term of this patent is extended or adjusted under 35 U.S.C. 154(b) by 0 days.

(21) Appl. No.: 15/754,305

(22) PCT Filed: Oct. 9, 2015

(86) PCT No.: PCT/US2015/054939
§ 371 (c)(1),
(2) Date: Feb. 22, 2018

(87) PCT Pub. No.: WO2017/062034
PCT Pub. Date: Apr. 13, 2017

(65) Prior Publication Data
US 2018/0248470 A1  Aug. 30, 2018

(51) Int. Cl.
*H02M 1/12* (2006.01)
*H02M 7/538* (2007.01)
*H02M 7/5387* (2007.01)

(52) U.S. Cl.
CPC .............. *H02M 1/12* (2013.01); *H02M 7/538* (2013.01); *H02M 7/5387* (2013.01)

(58) Field of Classification Search
CPC ...... H02M 1/12; H02M 7/537; H02M 7/5387; H02M 7/53871; H02M 2007/5387; H02M 2007/53871
See application file for complete search history.

(56) References Cited

U.S. PATENT DOCUMENTS 4,547,719 A * 10/1985 Sakamoto ......... H02M 7/53875
318/661
5,153,821 A * 10/1992 Blasko ................ H02M 7/5395
318/811
(Continued)

FOREIGN PATENT DOCUMENTS

EP  2 750 270 A1  7/2014
WO  2009/121867 A1  10/2009

OTHER PUBLICATIONS

International Search Report and Written Opinion issued in connection with corresponding PCT Application No. PCT/US2015/054939 dated Jun. 10, 2016.
(Continued)

*Primary Examiner* — Matthew V Nguyen
(74) *Attorney, Agent, or Firm* — Dority & Manning, P.A.

(57) ABSTRACT

Systems and methods for controlling a DC to AC inverter providing a multiphase output at a fundamental frequency are provided. More particularly, a synchronous reference frame control scheme can be employed to regulate a DC to AC inverter to attenuate error at various frequencies of interest for the DC to AC inverter. According to particular example aspects of the present disclosure, the synchronous reference frame control scheme can include control structures to provide for attenuation of the negative sequence and zero sequence currents, leading to reduced total harmonic distortion and voltage unbalance in the output voltage of the inverter.

20 Claims, 6 Drawing Sheets

(56) References Cited

U.S. PATENT DOCUMENTS

| | | | |
|---|---|---|---|
| 9,831,802 B1* | 11/2017 | Hu | H02M 1/08 |
| 2005/0063202 A1 | 3/2005 | Stancu et al. | |
| 2015/0326166 A1* | 11/2015 | Hayashi | B62D 5/0403 |
| | | | 318/503 |
| 2017/0047862 A1* | 2/2017 | Luo | H02J 3/38 |

OTHER PUBLICATIONS

International Preliminary Report on Patentability issued in connection with corresponding PCT Application No. PCT/US2015/054939 dated Apr. 10, 2018.

* cited by examiner

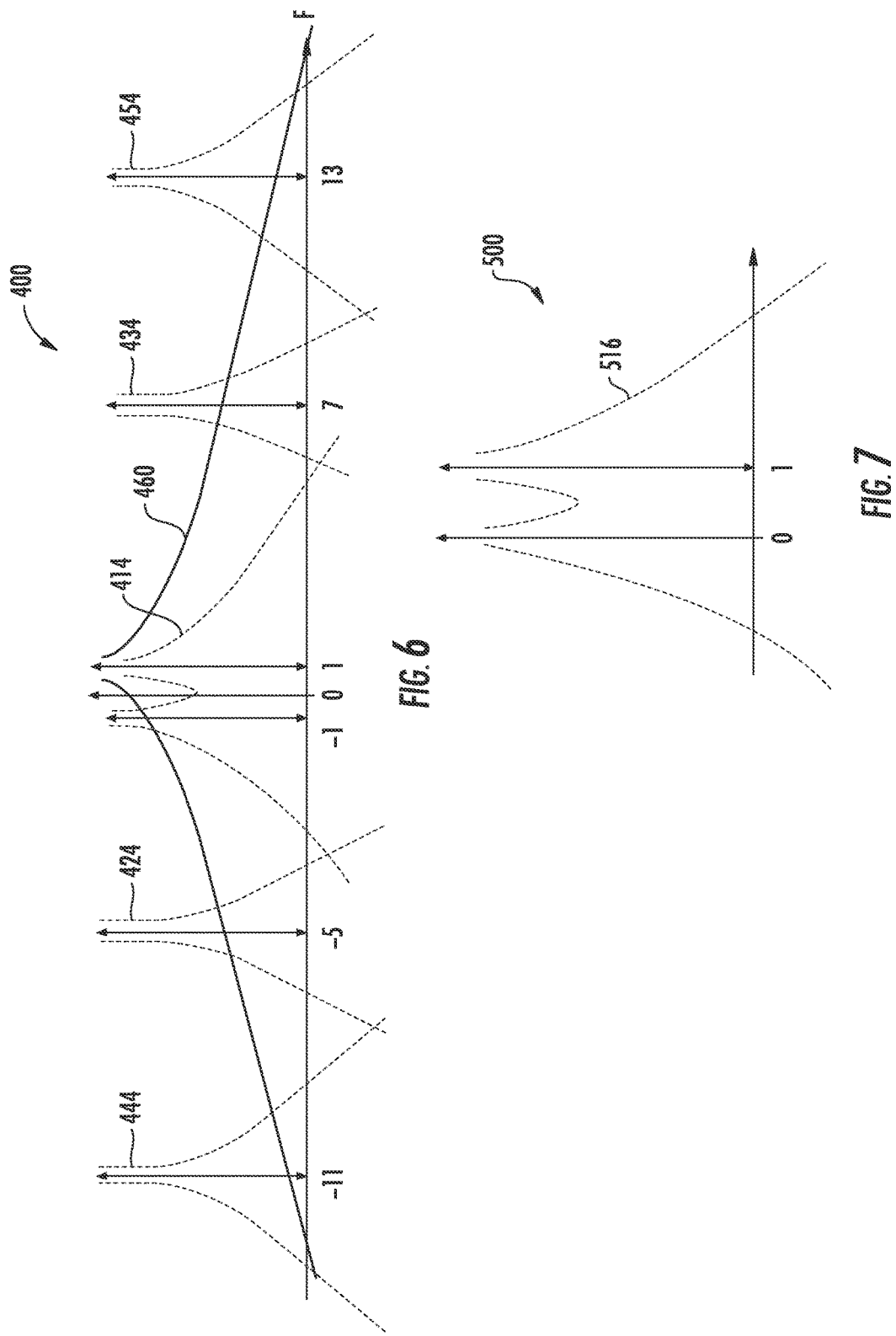

CONTROL OF AC SOURCE INVERTER TO REDUCE TOTAL HARMONIC DISTORTATION AND OUTPUT VOLTAGE UNBALANCE

FIELD OF THE INVENTION

The present subject matter relates generally to power converters and more particularly to systems and methods for controlling a power converter.

BACKGROUND OF THE INVENTION

DC to AC inverters can be used to generate a multiphase output from a DC power source. For instance, DC to AC inverters can be used in aviation applications to generate a three-phase AC output at a fundamental frequency of about 400 Hz from a DC power source. DC to AC inverters can include a plurality of bridge circuits that include semiconductor switching elements (e.g. IGBTs, SiC transistors, etc.) that are controlled using pulse width modulation techniques to convert a DC input to, for instance, a three-phase output. The inverter can additionally provide a neutral output by adding an additional bridge circuit to form a neutral leg of the inverter. The DC to AC inverter can be used to power single phase loads by coupling loads to one of the output phases and to the neutral output of the inverter.

Powering single phase loads from a multiphase DC to AC inverter can result in unbalanced loading of the inverter. Unbalanced loading can lead to creation of negative sequence and zero sequence currents by the inverter. These currents can create the same negative sequence and zero sequence components in the output voltage of the inverter. In addition, six-pulse inverters can create harmonics at, for instance, negative fifth harmonic and seventh harmonic of the fundamental frequency. Twelve-pulse inverters can create harmonics at, for instance, the negative eleventh harmonic and thirteenth harmonic of the fundamental frequency.

DC to AC inverters can be controlled using various control schemes, including natural frame (abc) control schemes, stationary reference frame control schemes, or synchronous reference frame control schemes. In a natural frame control scheme, identical control structures are used for each phase of the inverter. The control structure for each phase can include a voltage controller and a current controller. The voltage controller can be an outer control loop relative to the current controller and can generate a current reference for the current controller. The current controller can generate a voltage command, which can be used to determine gate timing signals for driving the switching elements of the bridge circuit. If the inverter includes a neutral leg, the voltage command for the neutral leg bridge circuit can be an average value of the voltage command for each of the phases of the inverter. The neutral leg typically does not have its own controller.

The controllers in a natural frame control scheme essentially operate at DC. As a result the controllers have infinite gain at DC and finite gain at the fundamental frequency, the negative sequence, the negative fifth harmonic, the positive seventh harmonic, and other harmonics of interest. FIG. 1 depicts a graphical representation 50 of the gain of the natural frame controller. FIG. 1 plots frequency along the horizontal axis and gain along the vertical axis. As shown in FIG. 1, the controller can reduce the magnitude of the fundamental frequency, negative sequence, negative fifth harmonic, positive seventh harmonic, etc. However, the controller does not eliminate these components as the controller does not have infinite gain at these frequencies. Accordingly, whatever remains of these components in the output voltage can lead to an increase in total harmonic distortion and voltage unbalance in the output voltage of the inverter.

Synchronous reference frame control schemes can operate based on a d-q transformation (e.g., performed using a Park transformation) that transforms the output voltage and current waveforms into a reference frame that rotates synchronously with the output voltage. Multiple synchronous reference frame controllers can include a plurality of control structures to introduce infinite gain at each of the frequencies of interest (e.g., fundamental, −11, −5, +7 and +13 of the fundamental frequency).

However, a condition of synchronous reference frame control schemes is that the controllers in the control structure for each frequency of interest have gains that cross each other below 0 dB. As a result the bandwidth of each controller used in the synchronous reference frame control scheme can be limited, leading to gaps in the control action of each controller. FIG. 2 depicts a graphical representation of the gains of various current and voltage controllers at each of the frequencies of interest for a known synchronous reference frame control scheme 60. FIG. 2 plots frequency along the horizontal axis and gain along the vertical axis. The solid lines represent gains associated with the current controllers. The dashed lines represent gains associated with the voltage controllers. As shown, the synchronous reference frame control scheme can provide infinite gains at the fundamental frequency as well as at selected frequencies of interest. However, due to the limited bandwidth of the controllers, the negative sequence attenuation (e.g., at the −1 frequency) is still required to be performed with the control structure used to attenuate the fundamental frequency. As a result, the control structure does not provide infinite gain for the negative sequence.

FIG. 3 provides a graphical depiction 70 of the gains associated with the regulation of the zero sequence component. FIG. 3 plots frequency along the horizontal axis and gain along the vertical axis. The solid lines represent gains associated with current controllers. The dashed lines represent gains associated with voltage controllers. The zero sequence component does not rotate, and thus it is not controlled using a synchronous reference controller. Rather, the zero sequence is controlled using controllers with finite gains at the fundamental frequency. As a result, typical multiple synchronous reference frame controllers do not completely regulate out the zero sequence and negative sequence components, leading to increased total harmonic distortion and voltage unbalance in the output voltage.

Thus, a need exists for a control scheme for regulating a DC to AC inverter that can reduce output voltage total harmonic distortion and voltage unbalance by providing improved regulation of the zero sequence and negative sequence components generated, for instance, by powering single phase loads with the DC to AC inverter.

BRIEF DESCRIPTION OF THE INVENTION

Aspects and advantages of embodiments of the present disclosure will be set forth in part in the following description, or may be learned from the description, or may be learned through practice of the embodiments.

One example aspect of the present disclosure is directed to a control system for a DC to AC inverter configured to provide a multiphase output at a fundamental frequency. The control system includes a plurality of synchronous reference frame control structures. Each synchronous reference frame control structure includes a voltage controller configured to provide a current reference based on a voltage feedback signal. The control system further includes a shared current controller configured to determine a voltage command for controlling one or more bridge circuits of the DC to AC inverter. The shared current controller is disposed as an inner control loop relative to the voltage controller of each of the plurality of synchronous reference frame control structures.

Another example aspect of the present disclosure is directed to a method for controlling a DC to AC inverter configured to provide a multiphase output at a fundamental frequency. The method includes determining a voltage reference signal using an outer voltage control loop having a voltage controller with infinite gain at a frequency associated with a negative sequence component. The method further includes determining a voltage error signal based at least in part on the voltage reference signal and determining a current reference signal based at least in part on the voltage error signal at a voltage controller of a synchronous reference frame control structure. The method includes generating, with a current controller, a voltage command for controlling one or more bridge circuits based at least in part on the current reference.

Yet another example aspect of the present disclosure is directed to a control system for a DC to AC inverter configured to provide a multiphase output at a fundamental frequency. The control system includes a plurality of synchronous reference frame control structures. Each synchronous reference frame control structure can be associated with a different frequency. At least one of the plurality of synchronous reference frame control structures can be associated with the fundamental frequency. Each synchronous reference frame control structure includes a voltage controller configured to provide a current reference based at least in part on a voltage feedback signal. The control system further includes an outer voltage control loop in communication with the synchronous reference frame control structure associated with the fundamental frequency. The outer voltage control loop includes an outer loop voltage controller having an infinite gain at a frequency associated with a negative sequence component. The voltage controller of the synchronous reference frame control structure associated with the fundamental frequency is configured to determine a current reference based at least in part on a voltage reference provided by the outer loop voltage controller.

Variations and modifications can be made to these example aspects of the present disclosure.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which:

FIG. 6 depicts a graphical representation of the gains associated with controllers used in a synchronous reference frame control scheme according to example embodiments of the present disclosure;

FIG. 7 depicts a graphical representation of the gains associated with controllers used to regulate a zero sequence component in a control scheme according to example embodiments of the present disclosure.

DETAILED DESCRIPTION OF THE INVENTION

Figure 1:
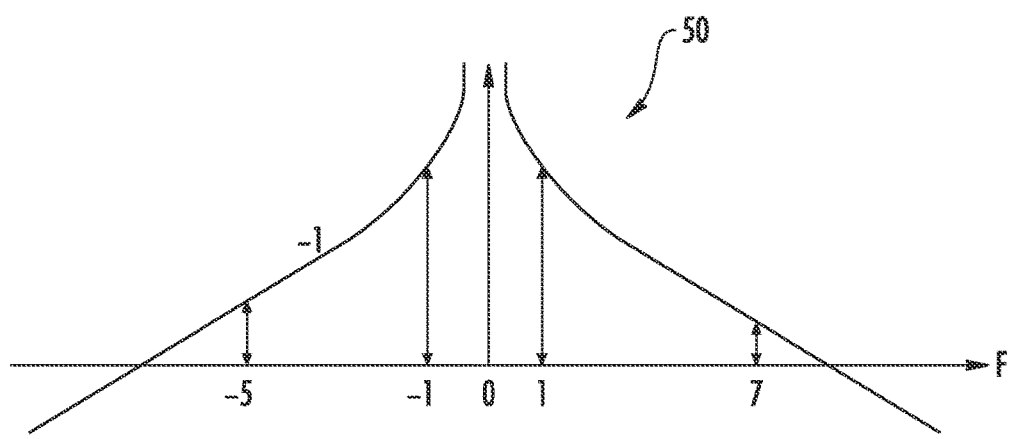
FIG. 1 depicts a graphical representation of the gain associated with controllers used in a natural reference frame control scheme for a DC to AC inverter.
Figure 2:
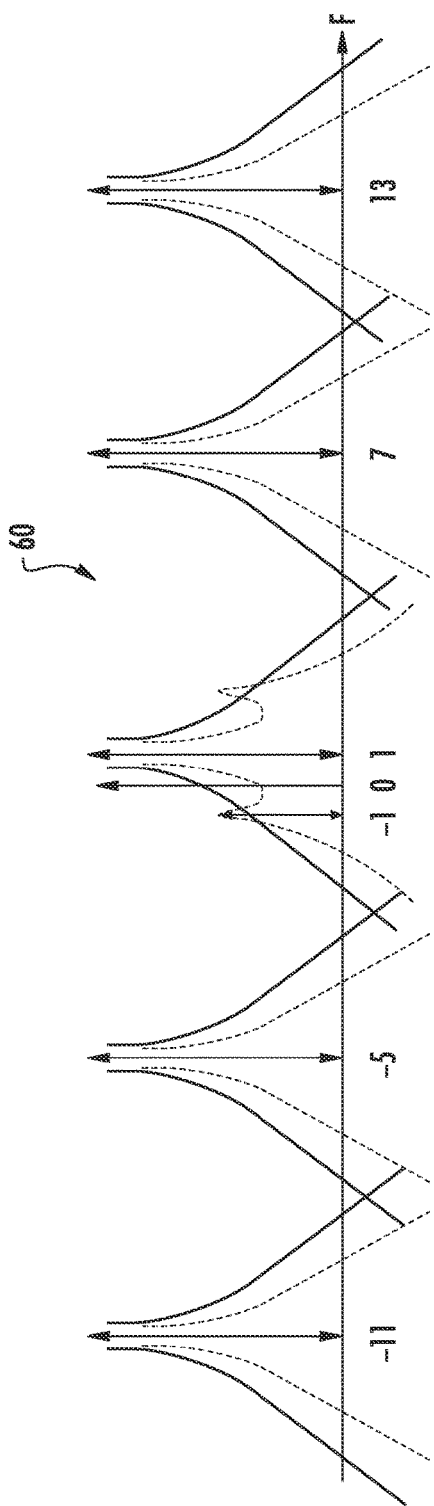
FIG. 2 depicts a graphical representation of the gains associated with controllers used in a synchronous reference frame control scheme.
Figure 3:
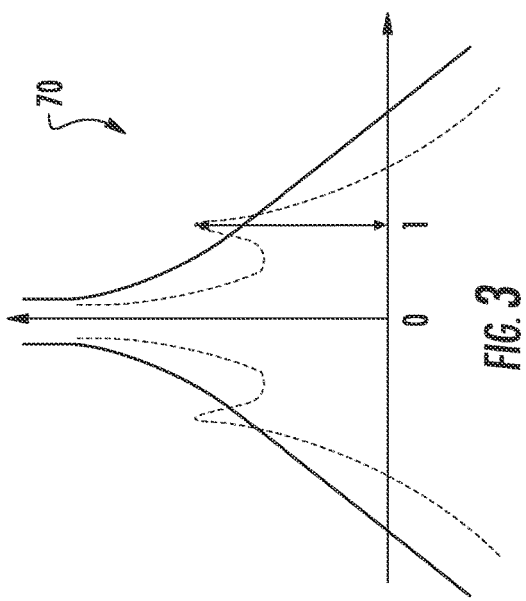
FIG. 3 depicts a graphical representation of the gains associated with controllers used to regulate a zero sequence component.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Example aspects of the present disclosure are directed to control systems and methods for controlling power converters, for instance, to reduce total harmonic distortion and voltage unbalance in the output voltage of the power converter. More particularly, a synchronous reference frame control scheme can be employed to regulate a DC to AC inverter to attenuate error at various frequencies of interest for the DC to AC inverter. According to particular example aspects of the present disclosure, the synchronous reference frame control scheme can include control structures to provide for attenuation of the negative sequence and zero sequence currents, leading to reduced total harmonic distortion and voltage unbalance in the output voltage of the inverter.

More particularly, a control topology according to example aspects of the present disclosure can include a plurality of synchronous reference frame control structures. As used herein, a control structure refers to control logic or circuitry configured to implement one or more control functions, such as one or more of the controller functions, control loop functions, transform functions, and other control functions disclosed herein. In some implementations, a control structure can refer to a set of instructions stored in a memory device that when executed by one or more control devices (e.g., microprocessor(s), microcontroller(s), etc.), cause the one or more control devices to provide the desired control functionality.

Each of the plurality of synchronous reference frame control structures can be implemented in a d-q reference frame that rotates measured quantities (e.g., three phase voltage or three-phase current) into a rotating reference frame. Each of the plurality of synchronous reference frame control structures can be associated with a different frequency and can include a voltage controller having an infinite gain at a frequency of interest. For instance, in one embodiment, the plurality of synchronous reference frame control structures can include a control structure associated with the fundamental (1) frequency (e.g., 400 Hz in aviation applications), a control structure associated with a frequency corresponding to the negative fifth (−5) harmonic, and a control structure associated with a frequency corresponding to the seventh (7) harmonic. The control structures for regulating the −5 and 7 frequencies can be particularly suitable for six pulse DC to AC inverters, which can generate harmonics at the −5 and 7 frequencies.

In some embodiments, if the switching frequency of bridge circuits in the inverter are fast enough (e.g., SiC transistors), the control scheme can include a control structure associated with a frequency corresponding to the negative eleventh (−11) harmonic and a control structure associated with a frequency corresponding to the thirteenth (13) harmonic. The control structures for regulating the −11 and 13 frequencies can be particularly suitable for twelve pulse DC to AC inverters, which can generate harmonics at the −11 and 13 frequencies.

Each synchronous reference frame control structure can include a voltage controller configured to generate a current reference command based at least in part on a voltage error signal. The voltage controller for each synchronous reference frame control structure can have an infinite gain at the frequency the synchronous reference frame control structure is intended to regulate. For instance, the voltage controller of the synchronous reference frame control structure associated with the fundamental frequency can have an infinite gain at the fundamental frequency.

In some embodiments of the present disclosure, the control scheme can employ a shared current controller to provide current regulation for each of the plurality of synchronous reference frame control structures. The shared current controller can be configured as an inner control loop relative to the voltage controllers of each of the plurality of synchronous reference frame control structures. The shared current controller can be a wide bandwidth current controller that is configured to determine a voltage command for controlling one or more bridge circuits of the DC to AC inverter based on a current error signal. The current error signal can be determined based at least in part on an aggregated current reference signal determined from the current reference signals provided by each of the voltage controllers of each of the plurality of synchronous reference frame control structures.

Because the voltage controllers of the plurality of synchronous reference frame control signals provide infinite gain at the frequencies of interest, the shared current controller does not need to have an infinite gain at each of the frequencies of interest. As a result, the shared current loop can provide for wideband control that does not leave uncontrolled frequency gaps.

In some embodiments of the present disclosure, the control scheme can include an outer voltage control loop relative to at least one of the plurality of synchronous reference frame control structures to provide for attenuation of the negative sequence component. For instance, the outer voltage control loop can include an outer voltage controller having an infinite gain at a frequency associated with the negative sequence (e.g., the −1 frequency). The outer voltage control loop can be configured to provide a voltage reference to the synchronous reference frame control structure associated with the fundamental frequency. This configuration can allow for wide bandwidth control of the fundamental synchronous reference frame control structure and can achieve infinite gain at both the fundamental frequency and the frequency associated with the negative sequence.

In some embodiments of the present disclosure, the control scheme can further include a neutral control structure for controlling one or more bridge circuits associated with a neutral leg of the DC to AC inverter. The neutral control structure can be a non-rotating controller (e.g. not implemented in the d-q space). A pseudo d-q controller can be used in the neutral leg to provide an infinite gain at the fundamental frequency. The neutral control structure can further include a voltage controller configured as an inner control loop relative to the pseudo d-q controller. This voltage controller can be configured to provide an infinite gain at a frequency associated with the zero sequence component. In this manner, the neutral control structure can achieve infinite gain at both the fundamental frequency and a frequency associated with the zero sequence component, leading to reduced total harmonic distortion and voltage unbalance in the output voltage of the DC to AC inverter.

Figure 4:
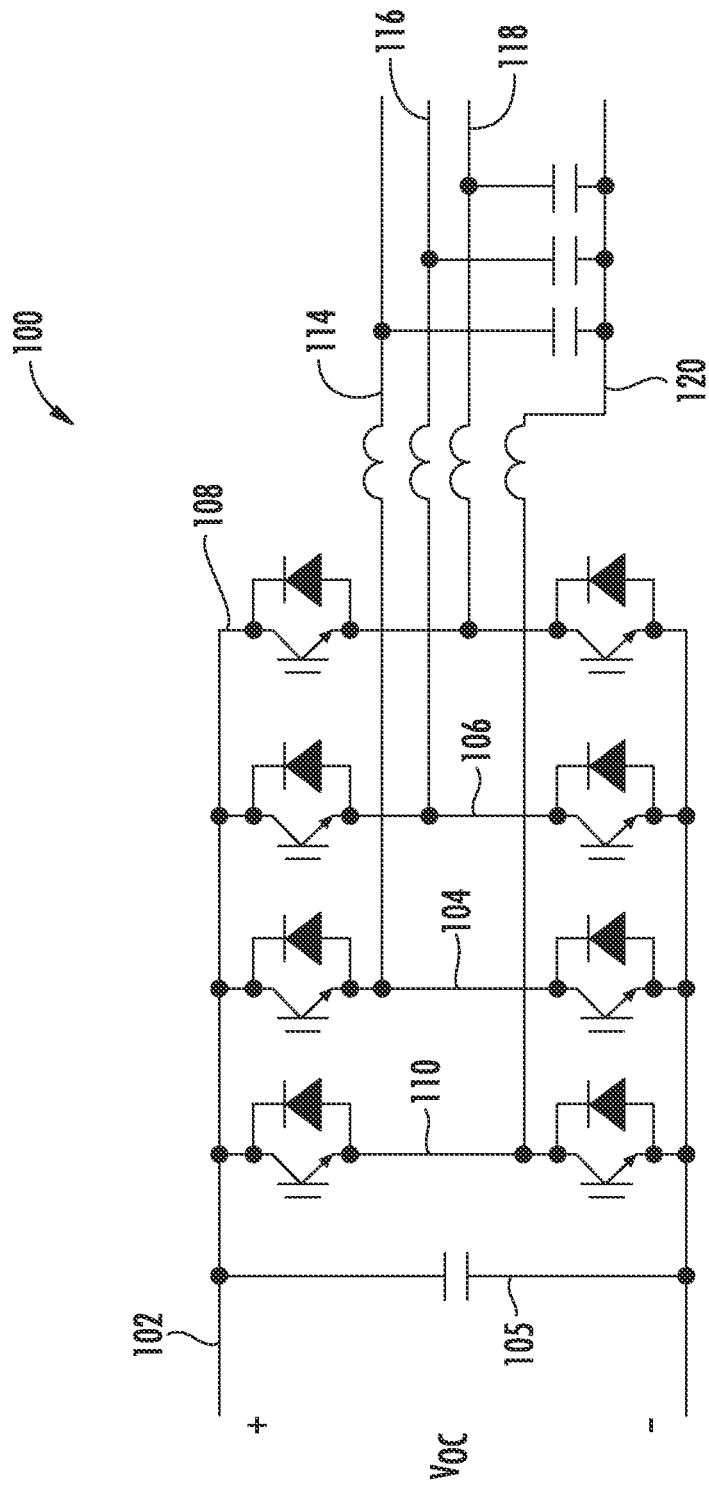
FIG. 4 depicts a circuit diagram of an example DC to AC inverter.

With reference now to the FIGS., example embodiments of the present disclosure will now be set forth. FIG. 4 depicts an example circuit diagram of a DC to AC inverter 100. The inverter 100 is configured to convert a DC power source $V_{DC}$ to an output three-phase voltage at a fundamental frequency. Other multiphase outputs are contemplated without deviating from the scope of the present disclosure. In example embodiments for aviation applications, the fundamental frequency is about 400 Hz. The use of the term about in conjunction with a numerical value is intended to refer to within 30% of the specified amount.

The inverter can receive the DC power from a DC bus 102. The DC bus 102 can include a DC bus capacitor 105. The DC power on the DC bus 102 can be converted to an output three-phase AC power using a plurality of bridge circuits, such as bridge circuit 104, bridge circuit 106, and bridge circuit 108. Each bridge circuit 104, 106, and 108 can include an upper switching element and a lower switching element coupled in series. The switching elements can be semiconductor devices, such as insulated gate bipolar transistors (IGBTs), silicon carbide (SiC) transistors, or other suitable switching elements. Each switching element can be coupled in parallel with a diode.

The switching elements can be controlled using gate timing commands to convert the DC power from the DC power source $V_{DC}$ into an output three-phase AC voltage including an A-phase 114, a B-phase 116, and a C-phase 118. The gate timing commands for the switching elements can be determined based at least in part on commands provided from the synchronous reference frame control scheme according to example aspects of the present disclosure as will be discussed in more detail below.

The inverter 100 can further include a neutral leg 110. The neutral leg 110 can similarly include a bride circuit having an upper switching element and a lower switching element. The switching elements of the neutral leg 110 can be controlled based at least in part one commands provided from a neutral control structure according to example embodiments of the present disclosure to provide a neutral reference 120. The neutral leg 110 can be eliminated in some embodiments by connecting a neutral between the split DC capacitor or by using a neutral forming transformer.

Single phase loads can be powered by the inverter 100 by coupling the load between the neutral reference 120 and one of the A-phase 114, B-phase 116, or C-phase 118. Powering single phase loads can lead to negative sequence and zero sequence components in the output voltage of the inverter 100. Example aspects of the present disclosure provide a control scheme using multiple synchronous reference frame control structures that regulate the negative sequence and zero sequence components to reduce total harmonic distortion and voltage unbalance in the output voltage of the inverter 100.

Figure 5:
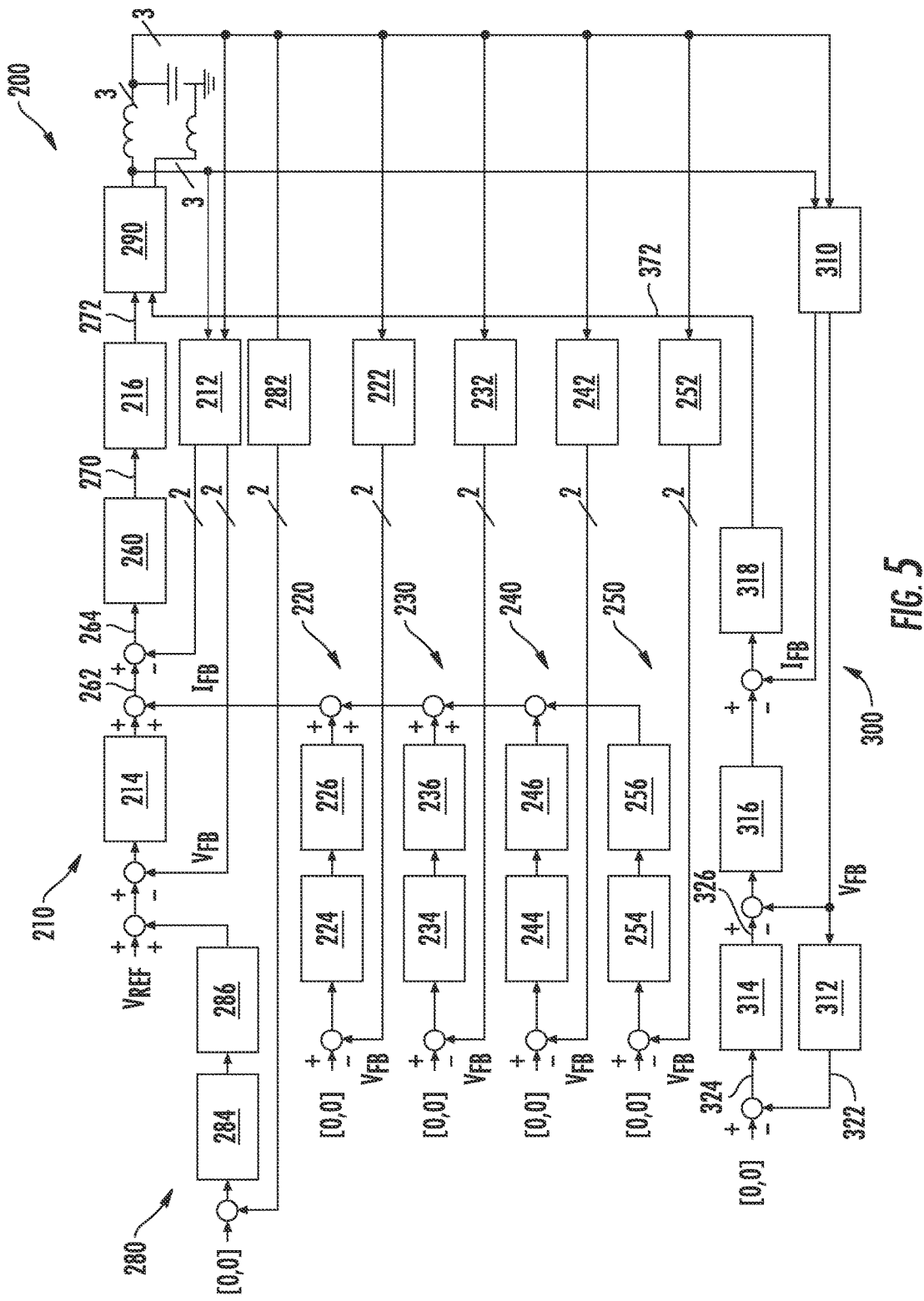
FIG. 5 depicts a multiple synchronous reference frame control scheme according to example embodiments of the present disclosure.

FIG. 5 depicts an example control scheme 200 according to example embodiments of the present disclosure. The control scheme 200 can be implemented using one or more control devices. In one implementation, the control scheme 200 can be implemented by one or more processors executing computer-readable instructions stored in one or more memory devices.

The control scheme 200 includes a plurality of synchronous reference frame control structures, including synchronous reference frame control structure 210, synchronous reference frame control structure 220, synchronous reference frame control structure 230, synchronous reference frame control structure 240, and synchronous reference frame control structure 250.

Each synchronous reference frame control structure is associated with a different frequency. For instance, control structure 210 is associated with the fundamental frequency. Control structure 220 is associated with the negative fifth harmonic. Control structure 230 is associated with the seventh harmonic. Control structure 240 is associated with the negative eleventh harmonic. Control structure 250 is associated with the thirteenth harmonic. More or fewer control structures associated with varying frequencies can be used in the control scheme 200 without deviating from the scope of the present disclosure.

Each control structure 210, 220, 230, 240, and 250 is a synchronous reference frame control structure that includes a voltage control loop implemented in the d-q space. More specifically, each control structure 210 can include a voltage control loop configured to receive a voltage feedback signal transformed to the d-q space at an appropriate rotational frequency. The voltage feedback signal can be used to determine an error signal based on a voltage reference. The error signal can be provided to a voltage controller having an infinite gain at the frequency associated with the control structure. The voltage controller can determine a current command. The voltage controllers in the synchronous reference frame control structures can be proportional integral controllers or other suitable controllers (e.g. PD controllers, PID controllers, etc.).

More particularly, synchronous reference frame control structure 210 associated with the fundamental frequency can include a rotation transform 212 configured to transform a three-phase voltage feedback signal to a voltage feedback signal in the d-q space associated with the fundamental frequency. As shown, the transformed voltage feedback signal can be used to determine an error signal based on a voltage reference $V_{REF}$. The error signal can be provided to the voltage controller 214, which can determine a current reference based at least in part on the error signal. The voltage controller 214 can have an infinite gain at the fundamental frequency.

Synchronous reference frame control structure 220 can include a rotation transform 222 configured to transform a three-phase voltage feedback signal to a voltage feedback signal in the d-q space associated with the negative fifth harmonic. The transformed voltage feedback signal can be used to determine an error signal based on a reference. In some implementations, the reference for the negative fifth harmonic can be [0, 0] to reduce components at the negative fifth harmonic. The error signal can be provided to voltage controller 224, which can determine a current reference based at least in part on the error signal. The voltage controller 224 can have an infinite gain at the negative fifth harmonic. The control structure 220 can include a transform 226 to transform the current reference from the d-q space associated with the negative fifth harmonic to the d-q space associated with the fundamental frequency.

Synchronous reference frame control structure 230 can include a rotation transform 232 configured to transform a three-phase voltage feedback signal to a voltage feedback signal in the d-q space associated with the seventh harmonic. The transformed voltage feedback signal can be used to determine an error signal based on a reference. In some implementations, the reference for the seventh harmonic can be [0, 0] to reduce components at the seventh harmonic. The error signal can be provided to voltage controller 234, which can determine a current reference based at least in part on the error signal. The voltage controller 234 can have an infinite gain at the seventh harmonic. The control structure 230 can include a transform 236 to transform the current reference from the d-q space associated with the seventh harmonic to the d-q space associated with the fundamental frequency.

Synchronous reference frame control structure 240 can include a rotation transform 242 configured to transform a three-phase voltage feedback signal to a voltage feedback signal in the d-q space associated with the negative eleventh harmonic. The transformed voltage feedback signal can be used to determine an error signal based on a reference. In some implementations, the reference for the negative eleventh harmonic can be [0, 0] to reduce components at the negative eleventh harmonic. The error signal can be provided to voltage controller 244, which can determine a current reference based at least in part on the error signal. The voltage controller 244 can have an infinite gain at the negative eleventh harmonic. The control structure 240 can include a transform 246 to transform the current reference from the d-q space associated with the negative eleventh harmonic to the d-q space associated with the fundamental frequency.

Synchronous reference frame control structure 250 can include a rotation transform 252 configured to transform a three-phase voltage feedback signal to a voltage feedback signal in the d-q space associated with the thirteenth harmonic. The transformed voltage feedback signal can be used to determine an error signal based on a reference. In some implementations, the reference for the thirteenth harmonic can be [0, 0] to reduce components at the thirteenth harmonic. The error signal can be provided to voltage controller 254, which can determine a current reference based at least in part on the error signal. The voltage controller 254 can have an infinite gain at the thirteenth harmonic. The control structure 250 can include a transform 256 to transform the current reference from the d-q space associated with the thirteenth harmonic to the d-q space associated with the fundamental frequency.

As depicted in FIG. 5, the control scheme 200 can include a shared current controller 260 in the control structure 210 for the fundamental frequency. The shared current controller 260 can be configured as an inner control loop relative to the voltage control loops associated with the control structures 210, 220, 230, 240, and 250. The shared current controller 260 can be a proportional integral controller or other suitable controller (e.g., PD controller, PID controller, etc.).

The shared current controller 260 can determine a voltage command 270 for controlling one or more bridge circuits 290 associated with the DC to AC inverter based at least in part on an aggregated current reference 262. As shown in FIG. 5, the aggregated current reference 262 can be determined as the sum of the current references determined by each of the voltage controllers (after being transformed to the d-q-space associated with the fundamental frequency) associated with the different control structures 210, 220, 230, 240, and 250.

The shared current control loop can receive a current feedback signal $I_{FB}$ transformed to the d-q space associated with the fundamental frequency by transform 212. A current error signal 264 can be determined based at least in part on a difference between the aggregated current reference 262 and the current feedback signal $I_{FB}$. The current error signal 264 can be provided to the shared current controller 260, which can be a wideband controller having an infinite gain at the fundamental frequency. The shared current controller 260 can determine the voltage command 270 based on the current error signal 264. The voltage command 270 can be provided to transform 216 which converts the voltage command 270 from the d-q-space to a voltage command 272 associated with the natural reference frame space.

The voltage command 272 can be provided to control logic which determines gate timing commands for switching elements in the bridge circuits 290 of the DC to AC inverter based on the voltage command 272. The bridge circuits 290 can be controlled in accordance with the determined gate timing commands to generate a three-phase output voltage at the fundamental frequency.

To regulate negative sequence components, the control scheme 200 further includes an outer voltage control loop 280 in communication with the control structure 210 associated with the fundamental frequency. The outer voltage control loop 280 can be configured as an outer control loop relative to the voltage control loop and current control loop of the control structure 210 associated with the fundamental frequency.

More particularly, the outer voltage control loop 280 can include a rotation transform 282 configured to transform a three-phase voltage feedback signal to a voltage feedback signal in the d-q space associated with a frequency corresponding to the negative sequence component. The transformed voltage feedback signal can be used to determine an error signal based on a reference. In some implementations, the reference for the negative sequence component can be [0, 0] to reduce the negative sequence component. The error signal can be provided to voltage controller 284, which can determine a voltage reference based at least in part on the error signal. The voltage controller 284 can have an infinite gain at a frequency associated with the negative sequence. The voltage controller 284 can be a proportional integral controller or other suitable controller (e.g., PD controller, PID controller, etc.).

The outer voltage control loop 280 can include a transform 286 to transform the voltage reference from the d-q space associated with the negative sequence to the d-q space associated with the fundamental frequency. The voltage reference can be used to adjust the voltage reference $V_{REF}$ provided to the control structure 210 associated with the fundamental frequency. In this way, the outer voltage control loop 280 in combination with the control structure 210 can regulate both the fundamental and negative sequence components by including a voltage controller 284 having an infinite gain at the frequency corresponding to the negative sequence component and a voltage controller 214 having an infinite gain corresponding to the fundamental frequency.

FIG. 6 provides a graphical representation 400 of the gains associated with the controllers used in the control scheme 200 according to example embodiments of the present disclosure. FIG. 6 plots frequency of interest along the horizontal axis and gain along the vertical axis. The solid curve 460 represents gain attributable to the shared current regulator 260. Dashed curve 414 represents gain attributable to the control structure 210 in combination with the outer voltage control loop 280. Dashed curve 424 represents gain attributable to the voltage regulator 224 in control structure 220. Dashed curve 434 represents gain attributable to the voltage regulator 234 in control structure 230. Dashed curve 444 represents gain attributable to the voltage regulator 244 in control structure 240. Dashed curve 454 represents gain attributable to the voltage regulator 254 in control structure 250.

As depicted, the control scheme 200 can achieve infinite gains at each of the frequencies of interest (e.g., 1, −1, −5, 7, −11, and 13) by virtue of the voltage controllers. The shared current controller provides a wideband gain that is infinite at the fundamental frequency to reduce gaps in the control scheme.

Referring back to FIG. 5, the control scheme 200 can further include a neutral control structure 300 for determining a neutral command 272 to control one or more bridge circuits associated with a neutral leg of the DC to AC inverter. The neutral control structure 300 can include a Z-transform to transform a measured current feedback signal and a voltage feedback signal to the Z-space. The voltage feedback signal can be provided to a pseudo d-q controller 312. The pseudo d-q controller can determine a voltage reference 322 based on the voltage feedback signal. The pseudo d-q controller 312 can provide infinite gain at the fundamental frequency. The pseudo d-q controller 312 can have 0 gain at all other frequencies.

The voltage reference 322 determined by the pseudo d-q controller can be used to adjust a voltage reference (in some implementations [0,0]) to an adjusted voltage reference 324. The adjusted voltage reference 324 can be provided to an outer voltage controller 314, which can be configured to provide an infinite gain at the frequency associated with the zero sequence component. The outer voltage controller can determine a voltage reference 326 for the neutral control structure based on the adjusted voltage reference 324. In this way, the combination of the pseudo d-q controller 312 and the outer voltage controller 314 in the neutral control structure 300 can regulate both the fundamental frequency and frequency associated with the zero sequence component. The voltage reference 326 can be used by voltage controller 316 and current controller 318 to generate the neutral command 372 for the neutral leg of the DC to AC inverter.

FIG. 7 depicts a graphical representation of gains associated with the controllers used in the neutral control leg 300 according to example aspects of the present disclosure. FIG. 7 plots frequency along the horizontal axis and gain along the vertical axis. Curve 516 depicts gains provided by the voltage controllers of the neutral control structure 300. As shown, the voltage controllers provide infinite gains at both the fundamental frequency and the frequency associated with the zero sequence component.

Figure 8:
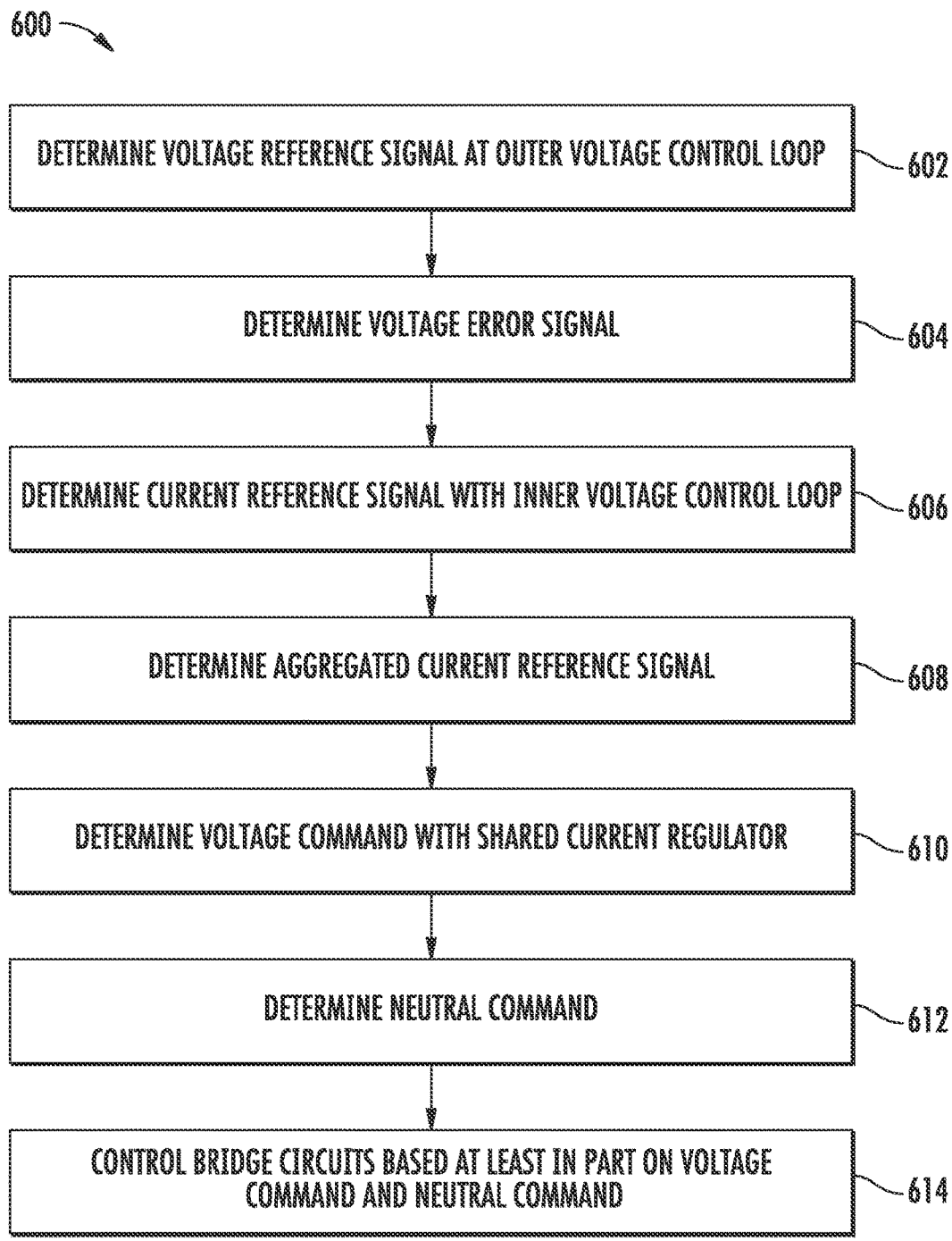
FIG. 8 depicts a flow diagram of an example method according to example embodiments of the present disclosure.

FIG. 8 depicts a flow diagram of an example method (600) for controlling a DC to AC inverter according to example embodiments of the present disclosure. The method (600) can be implemented using any suitable control scheme, such as the control scheme 200 depicted in FIG. 5. FIG. 8 depicts steps performed in a particular order for purposes of illustration and discussion of one example embodiment of the present disclosure. Those of ordinary skill in the art, using the disclosures provided herein will understand that the steps of any of the methods described herein can be combined, modified, expanded, omitted, rearranged or otherwise adapted in various ways without deviating from the scope of the present disclosure.

At (602), the method can include determining a voltage reference signal with an outer voltage control loop. For instance, the outer voltage control loop 280 of FIG. 5 can be used to determine a voltage reference based on a voltage feedback signal. The outer voltage control loop can include a voltage controller with infinite gain at a frequency associated with a negative sequence component.

At (604) of FIG. 8, an error signal is determined based on the voltage reference. For instance, as shown in FIG. 5, the voltage reference provided by the outer voltage control loop 280 can be used to adjust a voltage reference $V_{REF}$ for the control structure 210 associated with the fundamental frequency. A voltage error signal can be determined based at least in part on a difference between the adjusted voltage reference $V_{REF}$ and the voltage feedback signal $V_{FB}$.

At (606) of FIG. 8, a current reference signal is determined using an inner voltage control loop relative to the outer voltage control loop. For instance, the voltage error signal can be provided to the voltage controller 214 of FIG. 5 associated with the control structure 210. The voltage controller 214 have an infinite gain at the fundamental frequency. The voltage controller 214 can determine a current reference based at least in part on the voltage error signal.

At (608), an aggregated current reference signal is determined. For instance, the aggregated current reference 262 can be determined by aggregating current references generated by each voltage controller of the plurality of synchronous reference frame control structures 210, 220, 230, 240, and 250 of FIG. 5.

At (610), a voltage command for controlling one or more bridge circuits of an AC to DC converter is determined using a shared current controller. For instance, the shared current controller 260 of FIG. 5 can determine a voltage command for the one or more bridge circuits 290 based at least in part on the aggregated current reference 262. The shared current controller 260 can be configured as an inner control loop relative to the voltage controller of each of the plurality of synchronous reference frame control structures 210, 220, 230, 240, and 250. The shared current 260 regulator can be a wideband current controller having an infinite gain at the fundamental frequency.

At (612), the method can include determining a neutral command for a neutral leg of the DC to AC inverter using a neutral control structure. For instance, the neutral control structure 300 of FIG. 5 can be used to determine a neutral command 372 for controlling a bridge circuit associated with the neutral leg of the DC to AC inverter.

In particular implementations, determining the neutral command can include determining a first voltage reference 322 using a pseudo d-q controller 312 configured to provide an infinite gain at the fundamental frequency and determining a second voltage reference 324 based on the first voltage reference using a voltage controller 314 configured to provide an infinite gain at a frequency associated with a zero sequence component. The neutral command 372 can be determined based on the second voltage reference 324 using voltage controller 316 and current controller 318.

At (614), the method can include controlling bridge circuits based at least in part on the voltage command and the neutral command. For instance, control logic can be accessed to determine gate timing commands for the switching elements of the bridge circuits of the DC to AC inverter based on the voltage command and the neutral command. The switching elements of the bridge circuits can be driven based on the gate timing commands to provide a multiphase output at the fundamental frequency.

Although specific features of various embodiments may be shown in some drawings and not in others, this is for convenience only. In accordance with the principles of the present disclosure, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A control system for a DC to AC inverter configured to provide a multiphase output at a fundamental frequency, the control system comprising:
   a plurality of synchronous reference frame control structures, each synchronous reference frame control structure associated with a different frequency, each synchronous reference frame control structure comprising a voltage controller configured to provide a current reference based on a voltage feedback signal;
   an outer voltage control loop in communication with at least one of the plurality of synchronous reference frame control structures, the outer voltage control loop comprising an outer voltage controller having an infinite gain at a frequency associated with a negative sequence component; and
   a shared current controller configured to determine a voltage command for controlling one or more bridge circuits of the DC to AC inverter;
   wherein the shared current controller is configured as an inner control loop relative to the voltage controller of each of the plurality of synchronous reference frame control structures.

2. The control system of claim 1, wherein one of the plurality of synchronous reference frame control structures is associated with a fifth harmonic, one of the plurality of synchronous reference frame control structures is associated with a seventh harmonic, one of the plurality of synchronous reference frame control structures is associated with an eleventh harmonic, and one of the plurality of synchronous reference frame control structures is associated with a thirteenth harmonic.

3. The control system of claim 1, wherein the outer voltage controller is configured to provide a voltage reference to a synchronous reference frame control structure associated with the fundamental frequency.

4. The control system of claim 1, wherein the shared current controller provides infinite gain at the fundamental frequency of the DC to AC inverter.

5. The control system of claim 1, wherein the shared current controller is configured to determine the voltage command based at least in part on an aggregated current reference, the aggregated current reference determined based at least in part on a current reference determined by each voltage controller of the plurality of synchronous reference frame control structures.

6. The control system of claim 1, wherein the plurality of synchronous reference frame control structures comprise two or more of a control structure associated with the fundamental frequency, a control structure associated with the negative fifth harmonic of the fundamental frequency, a control structure associated with the :seventh harmonic of the fundamental frequency, a control structure associated with the negative eleventh harmonic of the fundamental frequency, and a control structure associated with the thirteenth harmonic of the fundamental frequency.

7. The control system of claim 1, wherein the control system further comprises a neutral control structure for controlling one or more bridge circuits associated with a neutral kg of the DC to AC inverter.

8. The control system of claim 1, wherein the neutral control structure comprises:
a pseudo d-q controller configured to provide an infinite gain at the fundamental frequency; and a voltage controller configured to provide an infinite gain at a frequency associated with a zero sequence component.

9. The control system of claim 1, wherein the plurality of synchronous reference frame control structures are implemented at least in part in a d-q space.

10. The control system of claim 1, wherein the fundamental frequency is about 400 Hz.

11. The control system of claim 1, wherein the DC to AC inverter is configured to provide AC power to one or more single phase loads.

12. A method of controlling a DC to AC inverter configured to provide a multiphase output at a fundamental frequency, the method comprising:
determining a voltage reference signal using an outer voltage control loop having a voltage controller with infinite gain at a frequency associated with a negative sequence component;
determining a voltage error signal based at least in part on the voltage reference signal;
determining a current reference signal based at least in part on the voltage error signal at a voltage controller of each of a plurality of synchronous reference frame control structures, wherein one of the plurality of synchronous reference frame control structures is associated with the fundamental frequency and wherein each synchronous reference frame control structure is associated with a different frequency;
determining an aggregated current reference signal based at least in part on the current reference signals determined by the voltage controller of each of the plurality of synchronous reference frame control structures; and
generating, with a shared current controller configured as an inner control loop for each of the plurality of synchronous reference frame control structures, a voltage command for controlling one or more bridge circuits based at least in part on the aggregated current reference signal.

13. The method of claim 12, further comprising:
determining a current error signal based at least in part on a difference between the aggregated current reference signal and a current feedback signal of the inner control loop, and
wherein the voltage command generated by the shared current controller is based at least in part on the current error signal.

14. The method of claim 12, wherein the shared current controller provides infinite gain at the fundamental frequency.

15. The method of claim 13, wherein the method further comprises determining a neutral command for controlling one or more bridge circuits associated with a neutral leg of the DC to AC inverter.

16. The method of claim 15, wherein determining a neutral command for controlling one or more bridge circuits associated with neutral leg of the DC to AC inverter comprises:
determining a first voltage reference using a pseudo d-q controller configured to provide an infinite gain at the fundamental frequency;
determining a second voltage reference based at least in part on the first voltage reference using a voltage controller configured to provide an infinite gain at a frequency associated with a zero sequence component; and
determining the neutral command based at least in part on the second voltage reference.

17. A control system for a DC to AC inverter configured to provide a multiphase output at a fundamental frequency, the control system comprising:
a plurality of synchronous reference frame control structures, each synchronous reference frame control structure associated with a different frequency, at least one of the plurality of synchronous reference frame control structures associated with the fundamental frequency, each synchronous reference frame control structure comprising a voltage controller configured to provide a current reference based at least in part on a voltage feedback signal;
a shared current controller configured to determine a voltage command for controlling one or more bridge circuits of the DC to AC inverter, wherein the shared current controller is configured as an inner control loop relative to the voltage controller of each of the plurality of synchronous reference frame control structures; and
an outer voltage control loop in communication with the synchronous reference frame control structure associated with the fundamental frequency, the outer voltage control loop comprising an outer voltage controller having an infinite gain at a frequency associated with a negative sequence component;
wherein the voltage controller of the synchronous reference frame control structure associated with the fundamental frequency is configured to determine a current reference based at least in part on a voltage reference provided by the outer voltage controller.

18. The control system of claim 17, wherein the shared current controller is configured to determine the voltage command based at least in part on an aggregated current reference, the aggregated current reference determined based at least in part on the current reference determined by each voltage controller of the plurality of synchronous reference frame control structures.

19. The control system of claim 17, wherein the plurality of synchronous reference frame control structures are implemented at least in part in a d-q space.

20. The control system of claim 17, wherein the voltage controller for the synchronous reference frame control structure associated with the fundamental frequency has an infinite gain associated with the fundamental frequency.

* * * * *